United States Patent [19]

Horowitz et al.

[11] 4,176,094
[45] Nov. 27, 1979

[54] METHOD OF MAKING STOICHIOMETRIC LEAD AND BISMUTH PYROCHLORE COMPOUNDS USING AN ALKALINE MEDIUM

[75] Inventors: Harold S. Horowitz, Clark; John M. Longo, New Providence; Joseph T. Lewandowski, Middlesex, all of N.J.

[73] Assignee: Exxon Research & Engineering Co., Florham Park, N.J.

[21] Appl. No.: 938,374

[22] Filed: Aug. 31, 1978

Related U.S. Application Data

[63] Continuation-in-part of Ser. No. 856,648, Dec. 2, 1977, Pat. No. 4,129,525.

[51] Int. Cl.$^2$ .............................................. H01B 1/08
[52] U.S. Cl. .................................. 252/518; 423/593; 429/40
[58] Field of Search ...................... 252/518; 423/593; 429/40

[56] References Cited

U.S. PATENT DOCUMENTS

| 3,583,931 | 6/1971 | Bouchard | 423/593 X |
| 3,682,840 | 8/1972 | Van Loan | 252/518 |
| 3,769,382 | 10/1973 | Kuo et al. | 264/61 |
| 3,951,672 | 4/1976 | Langley et al. | 106/53 |

OTHER PUBLICATIONS

Longo, J. M. et al., Mat. Res. Bull., vol. 4, pp. 191-202, 1969.
Bouchard, R. J. et al., Mat. Res. Bull., vol. 6, pp. 669-680, 1971.
Sleight, A. W., Mat. Res. Bull., vol. 6, p. 775, 1971.

*Primary Examiner*—Benjamin R. Padgett
*Assistant Examiner*—E. Suzanne Parr
*Attorney, Agent, or Firm*—Kenneth P. Glynn

[57] ABSTRACT

A liquid solution method of preparing electrically conductive pyrochlore compounds having the formula:

$$A_2B_2O_{7-y}$$

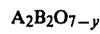

is disclosed wherein A is selected from lead, bismuth and mixtures thereof, B is selected from ruthenium, iridium and mixtures thereof, and $0 \leq y \leq 1$. The method involves reacting A and B cations to yield a pyrochlore oxide by precipitation of A and B cations from an aqueous solution source of these cations in a liquid alkaline medium having a pH of at least about 13.5 in the presence of an oxygen source sufficient to complete the desired stoichiometry, at a temperature below about 200° C. for a sufficient time for reaction to occur.

27 Claims, No Drawings

METHOD OF MAKING STOICHIOMETRIC LEAD AND BISMUTH PYROCHLORE COMPOUNDS USING AN ALKALINE MEDIUM

CROSS REFERENCE TO RELATED APPLICATION

This application is a continuation-in-part of copending application Ser. No. 856,648 filed Dec. 2, 1977, now U.S. Pat. No. 4,129,525.

BACKGROUND OF THE INVENTION AND PRIOR ART STATEMENT

The present invention is directed to a method of preparation of pyrochlore structure compounds. More particularly, the present invention is directed to a method of preparing stoichiometric lead-containing and bismuth-containing ruthenate and iridate pyrochlores. These pyrochlores have many uses including use as oxygen electrodes in electrochemical devices.

A number of various types of electrochemical devices have been developed over the past few years for the production of electrical energy by electrochemical reaction and obversely for the consumption of electrical energy to effectuate electrochemical reactions. Many of these devices rely upon a reaction involving oxygen (or air) as part of the mechanism to accomplish the desired result. For example, such devices may contain oxygen electrodes which are oxygen reducing cathodes in which oxygen is catalytically electroreduced. Alternatively, such devices may contain oxygen electrodes which catalyze the evolution of oxygen from water. In general, these electrodes are known in the art as oxygen electrodes. Thus, metal-oxygen batteries, metal-air batteries, fuel cells, electrolyzers, metal electrowinning devices, etc., are among the well-known electrochemical devices which may contain oxygen electrodes. Typically, such devices contain electrocatalyst materials at one or more of their electrodes and precious metals, such as platinum (on carbon support) and silver (on carbon and other supports), are frequently employed as electrocatalysts.

In addition, various electrocatalytic alloys, compounds and compound mixtures have been developed for these electrochemical devices to achieve more desirable systems. For example, U.S. Pat. No. 3,536,533 (Kitamura) describes the use of an alloy of gold, silver, palladium and at least one of platinum, rhodium and ruthenium as a fuel cell electrode electrocatalyst, and U.S. Pat. No. 3,305,402 (Jones et al) describes the use of a combination of platinum and ruthenium oxides as an electrocatalyst. However, both references describe these catalysts as fuel cell anode (or fuel oxidation) catalysts. O'Grady et al, Technical Report No. 37, "Ruthenium Oxide Catalysts For The Oxygen Electrode", Contract No., N0014-67-A-0404-0006 (AD-779-899) Office of Naval Research, May 1974 (National Technical Information Service) describes the use of ruthenium oxide as an electrochemical catalyst for both the generation of oxygen and the reduction of oxygen. U.S. Pat. No. 3,405,010 (Kordesch et al) teaches that spinal type electrode catalysts have been found to produce better activation of the electrode and improved electrolyte repellency of the electrode by the inclusion of ruthenium. Thus, the prior art describes various types of electrodes including those which utilize iridium and/or ruthenium-containing catalysts.

Heretofore, many pyrochlore compounds such as the pyrochlore compounds $Pb_2Ru_2O_{7-y}$ (lattice parameter of 10.253 Å), $Pb_2Ir_2O_{7-y}$ (lattice parameter of 10.271 Å), $Bi_2Ir_2O_{7-y}$, $Bi_2Rh_2O_{7-y}$, $Pb_2Rh_2O_{7-y}$, $Pb_2Pt_2O_{7-y}$ and $Cd_2Re_2O_{7-y}$, commonly referred to as lead ruthenate, lead iridate, bismuth iridate, bismuth rhodate, lead rhodate, lead platinate and cadmium rhenate, respectively, and similar compounds, have been known. For example, Longo, Raccah and Goodenough, Mat. Res. Bull., Vol. 4, pp. 191–202 (1969), have described the compounds $Pb_2Ru_2O_{7-y}$ and $Pb_2Ir_2O_{7-y}$ and their preparation at elevated temperatures which are in excess of 700° C. Sleight, Mat. Res. Bull., Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271 Å) and their preparation at 700° C. and 3000 atmospheres of pressure. U.S. Pat. No. 3,682,840 (Van Loan) describes the preparation of lead ruthenate at temperatures of 800° C. and higher. However, none of these references teach that lead or bismuth-containing compounds may be made by the present invention wherein they are prepared in an alkaline medium at temperatures below about 200° C., as claimed herein.

U.S. Pat. Nos. 3,769,382 (Kuo et al) and 3,951,672 (Langley et al) both disclose the preparation of lead ruthenate and lead iridate using various techniques at temperatures of at least about 600° C., and preferably at higher temperatures. Likewise, however, these references fail to recognize that the lead and bismuth pyrochlores made by the method of the present invention are obtained at generally lower temperatures as more specifically recited below.

Bouchard and Gillson, Mat. Res. Bull., Vol. 6, pp. 669–680 (1971) describe $Bi_2Ru_2O_7$ and $Bi_2Ir_2O_7$ preparation and properties, including the fact that these compounds have high conductivity and small Seebeck coefficients. However, there is no teaching that these compounds may be made by the method of the present invention. Derwent's Basic Abstract Journal, Section E, Chemdoc, Week No. Y25, Abstract No. 320 (August 17, 1977), Derwent Accession No. 44866Y/25 describes electrodes for electrolysis of alkaline and carbonate solutions which comprise nickel-plated steel strips coated with high conductivity layers containing $Cd_2Re_2O_7$, $Pb_2Re_2O_{7-y}$ or $Ni_2Re_2O_7$. These compounds are prepared by impregnating perrhenic acid and a metal nitrate such as Cd nitrate onto a nickel strip and baking at 350° C. However, these compounds are all rhenates rather than ruthenates or iridates and are not taught to be prepared by the very method of the present invention.

It is seen that much of the above prior art dealing with the synthesis of the electrically conductive pyrochlore structure oxides have taught synthesis temperatures at least as high as 600° C. These highly elevated temperatures have been employed because they have been considered necessary to overcome the diffusional limitations encountered in solid state reactions. These highly elevated temperatures, however, result in the formation of sintered products with low surface areas. This is a disadvantageous condition for materials used in catalytic and electrocatalytic applications since the concentration of available catalytically active sites is limited.

It would be desirable from both an energy conservation standpoint and a maximization of surface area standpoint to carry out these materials syntheses at significantly lower temperatures, e.g. below 300° C., but the kinetics of solid state reactions are unfavorably sluggish. Solution syntheses offer one possible approach to achieving these very low temperature reactions. For example Trehoux, Abraham and Thomas, *Journal of Solid State Chemistry*, Vol. 21, pp. 203-209 (1977) and *C.R. Acad. Sc. Paris*, t. 281 pp. 379-380 (1975) describe the solution preparation of a pyrochlore compound of the formula $K_{1.14}Bi_{0.27}{}^{III}[Bi_{0.27}{}^{III}Bi_{1.73}{}^{V}]$ $[O_{4.9}OH_{1.1}]OH_{0.8}$. The synthesis is carried out by adding a bismuth nitrate solution to a solution of 17% potassium hydroxide containing an excess of potassium hypochlorite. The reaction is carried out in this medium for 2 hours in a reflux type of apparatus at a temperature slightly higher than 100° C. The method of synthesis and the product prepared are different in many respects from the synthesis method and products herein. The compound prepared in the cited reference is not an oxide but rather an oxyhydroxide which has a significant amount of protons incorporated into the bulk structure. Proton nuclear magnetic resonance experiments on the materials of the present invention show that they are oxides which do not have significant amounts of protons incorporated into the structure. The pyrochlore synthesized by Trehoux et al is not a ruthenium or iridium-containing compound and, in fact, is believed not to be an electrically conductive pyrochlore. The potassium hydroxide solution used in the Trehoux reference serves not only as a reaction medium but also as a constituent in the reaction since potassium is incorporated into the A site of the pyrochlore. In the method of the present invention the alkali solution employed is solely a reaction medium with no measurable amount of alkali metal cations incorporated in the pyrochlore compound which results from the synthesis.

Morgenstern-Badarau and Michel, *Ann. Chim.*, Vol. 6, pp. 109 et seq. (especially at 109-113) (1971), and *C. R. Acad. Sc. Paris*, Vol. 271, Seire C pp. 1313-1316 (1970) report the solution preparation of pyrochlore compounds having the formula $Pb_2Sn_2O_6 \cdot xH_2O$ where $0<x<1$. The conditions of preparation are strictly defined as follows: equimolar quantities of lead and tin are reacted from solution in the presence of the complexing agent nitrilo-triacetic acid (NITA) such that the concentration of $[NITA]/[Pb^{2+}]=2$. The pH of the reaction medium is fixed at 11 and the reaction is carried out for several hours at 80° C. The compound prepared by Morgenstern-Badarau et al is a hydrated oxide whereas materials made by the method of the present invention are oxides. The pyrochlore prepared in this reference, while it does contain lead, is not a lead ruthenate or iridate pyrochlore in any way similar to the materials prepared by the method of the present invention. In fact the pyrochlore prepared by Morgenstern-Badarau and Michel is believed not to be electrically conductive. While the presence of a complexing agent is required in the synthesis described in the cited reference, no such complexing agent is required in the method of preparation of the present invention. Furthermore, the specified range of pH of the synthesis medium in the method of the present invention clearly differs from the range of pH within which the method of the cited reference will operate. In fact the Morgenstern-Badarau and Michel, Ann. Chim., Vol. 6, pp. 109-124 (1971) reference clearly states that no solid product compound can be obtained if conditions which are coincident with those specified for the present invention (pH>13.5, temperature=80° C., zero concentration of complexing agent) are employed.

In summary, there exists a formidable body of prior art describing the existence of various pyrochlores, their potential uses including uses as dielectric materials, and describing various metals and metal oxides as electrocatalyst materials. Notwithstanding such prior art, there is no suggestion or teaching that the specified lead-containing or bismuth-containing pyrochlore compounds may be made by the method of the present invention.

DESCRIPTION OF THE PRESENT INVENTION

The present invention is directed to a method of preparing compounds having the formula:

$$A_2B_2O_{7-y} \qquad (1)$$

wherein A is selected from the group consisting of lead, bismuth and mixtures thereof, B is selected from the group consisting of ruthenium, iridium and mixtures thereof, and wherein y is a value such that $0 \leq y \leq 1$.

The compounds made by the method of the present invention, as represented by formula (1) above, display the pyrochlore crystal structure. Pyrochlore structure oxides are represented by the general formula $A_2B_2O_6O'$ wherein A and B are metal cations. A detailed description of their crystallographic structure may be found in *Structural Inorganic Chemistry*, Fourth Edition by A. F. Wells, Clarendon Press, Oxford, 1975. Briefly, oxides of this type display a face-centered cubic structure having a unit cell dimension of about 10 Å. The B cations are octahedrally coordinated by oxygen anions (O). The structural framework is formed by a three dimensional array of these corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework". The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shared octahedra. The A cations reside in the center of these puckered hexagonal rings and are coordinated by the six O anions which define the rings plus two more O' cations at a slightly different distance. These O' anions reside at the center of the large holes in the octahedral framework. It is the O' anions which may be partially or totally absent, leading to the general pyrochlore oxide formula $A_2B_2O_{7-y}$ where $0 \leq y \leq 1$. Thus, the compounds made by the method of the present invention are referred to as pyrochlore compounds, and are stoichiometric pyrochlores of the above formula, containing lead and/or bismuth A cations and containing ruthenium and/or iridium B cations.

In general terms, the method of the present invention involves reacting approximately stoichiometric amounts of A and B cations to yield a pyrochlore oxide by precipitation of A and B cations from an aqueous solution source of these cations in a liquid alkaline medium in the presence of an oxygen source sufficient to complete the desired stoichiometry at a temperature below about 200° C. for a sufficient time for reaction to occur. The synthesis occurs entirely in a solution medium where the reaction kinetics are quite favorable and not so restrictive as is found in solid state reactions notwithstanding the low reaction temperature employed in the present method.

The aqueous solution source of reactant (A and B) cations is meant by definition to include any aqueous solution which will dissolve ionic A and B cations. This metal cation containing solution may be prepared using A source materials which include lead nitrate, lead oxide, lead chloride, lead acetate, lead carbonate, lead citrate, lead oxalate, bismuth nitrate, bismuth oxide, bismuth chloride, bismuth oxalate and bismuth oxychloride as well as mixtures thereof. Desirably, the A source material used in preparing the aqueous solution source of A and B cations is either a lead source material or a bismuth source material, although, as mentioned, mixtures of these may be used. Among the mentioned A source materials, preferred are lead and bismuth nitrates. The B source materials used in preparing the aqueous solution source of A and B cations include ruthenium chloride, ruthenium nitrate, ruthenium nitrosyl nitrate, iridium chloride, iridium hydroxide and iridium oxalic acid as well as mixtures thereof. Desirably, the B source material is either a ruthenium source or an iridium source, although mixtures thereof may be employed. The preferred B source materials include ruthenium nitrate and iridium chloride.

The aqueous solution source of A and B cations is prepared by dissolving appropriate amounts of A source material and B source material in aqueous solvent. In some cases water is adequate for this dissolution. When necessary, the A and B source materials may be dissolved in aqueous acid solutions, the acid solutions being just strong enough to cause the A and B source materials to dissolve. Acids such as nitric or hydrochloric may be used but nitric acid is preferred.

The A source material and B source material are dissolved in relative amounts so as to achieve, in general, an initial reactant A to B ion ratio which is approximately stoichiometric, i.e. about 1.0:1.0. Desirably, this ratio is within the range of about 0.95:1.0 to about 1.5:1.0. In the preferred embodiments the A to B ion ratio is in the range of about 1.0:1.0 to about 1.2:1.0. However, when more than 1.0:1.0 ratio of A to B ion is employed, a minor amount of A cation-rich compound (i.e. lead and/or bismuth-rich material) may be obtained with a major amount of the desired stoichiometric material, and the A cation-rich compound may be removed, e.g. by leachings.

Preparation of the aqueous solution source of A and B cations in the manner just described assures atomic scale mixing of these cations and thereby provides favorable kinetics for the low temperature, solution medium synthesis that follows.

The liquid alkaline medium is meant by definition to include any liquid alkaline medium which will promote reaction between the A ions and B ions from the mentioned aqueous solution source of A and B cations and will effect the precipitation of the desired pyrochlore structure. The liquid alkaline medium may be any which satisfies this definition and includes aqueous basic solutions of alkali metal hydroxides. Thus, the liquid alkaline medium may desirably be an aqueous basic solution containing a base selected from the group consisting of sodium hydroxide, rubidium hydroxide, cesium hydroxide, potassium hydroxide and mixtures thereof. Desirably, sufficient base is included so as to render a liquid alkaline medium having a pH of at least about 13.5. Preferably, sufficient base is employed so as to produce a liquid alkaline medium having a pH of between about 14 and 15.5. Exact amounts of base material need not be specified since pH determination is within the purview of the artisan.

It is also found to be helpful, although not necessary, to saturate the alkaline reaction medium with respect to one or more of the reactant cations (and especially with respect to the most alkali soluble cation reactant) prior to combination of the aqueous solution source of A and B cations with the alkaline reaction medium. This may be done so as to avoid large discrepancies between cation ratios in the reacted product and in the initial reactant mixture due to possible solubility in the alkaline reaction medium of one or more of the reactant cations. Thus, differential solubility apparently explains why the initial reactant A to B ion ratio may be set at a level higher than 1.0:1.0, even though a stoichiometric pyrochlore (A:B=1.0:1.0) is desired. This is particularly true in the case of lead-containing pyrochlores since lead is found to have a solubility in the alkaline reaction media which is several orders of magnitude greater than ruthenium or iridium.

It should be noted that the alkaline medium acts solely as a reaction medium and not as a constituent in the reaction. This is supported by the fact that the pyrochlores made by the method of this invention show less than 0.02% (by weight) alkali metal cation as measured by atomic absorption.

The oxygen source is meant to include by definition any source which will provide the oxygen needed to form the pyrochlore compound. The oxygen source may be any of the A source material, the B source material, the alkaline liquid medium (in the form of dissolved oxygen) or combinations thereof. In any event, an essential aspect of the present invention compound preparation is the inclusion of adequate oxygen to permit the formation of the desired pyrochlore structure. It is important to note that an essential aspect of this invention is that the provision of oxygen be carried out only to the extent necessary for the stabilization of stoichiometric pyrochlore. For example, in the case of lead ruthenate, the stoichiometric pyrochlore contains lead in the form of $Pb^{2+}$ only. Providing a significantly more oxidizing environment than that necessary for the stabilization of $Pb^{2+}$ will lead to the formation of $Pb^{4+}$ and consequently the synthesis of lead-rich pyrochlore, rather than the desired stoichiometric pyrochlore. While it is advantageous to bubble air or oxygen through the reaction medium when one wishes to synthesize lead-rich or bismuth-rich pyrochlore, such practice may not be desirable in preparing stoichiometric compounds, unless inclusion of A cation-rich compound is acceptable. The preferred practice of the present invention does not involve bubbling air or oxygen through the reaction medium but rather it entails merely carrying out the reaction in the presence of ambient atmosphere or with a blanket of oxygen or oxygen-containing gas over the reaction solution.

No criticality exists as to whether the aqueous solution source of A and B cations is added to the alkaline medium or whether the alkaline medium is added to the aqueous solution source of reactant cations. However, the former is usually practiced to insure that all of the cations see an excess of alkaline medium. In general, at least about 1.0 liter of liquid alkaline medium is used per sum total mole of metal cation reactant. As mentioned, the reaction may be carried out at temperatures below about 200° C. Desirably, the reaction temperature is within the range of about 10 to about 100° C. Preferably, the reaction is carried out at temperatures within the range of about 50° to about 80° C.

During the reaction period the alkaline medium may be replaced with fresh alkaline medium, and although this is not necessary for successful practice of the invention, it is a preferred practice.

It has been found that the nonstoichiometric pyrochlores (lead-rich and bismuth-rich) have a finite solubility in alkaline media, and more specifically that the solubility increases as the A to B ratio of the pyrochlore increases. As an example, in the case of lead-rich lead ruthenate, it is found that the $Pb^{4+}$ component of lead-rich pyrochlores preferentially dissolves. This preferential dissolution of $Pb^{4+}$ from the pyrochlore can be accelerated by maintaining the lead ion concentration in the alkaline medium at as low a level as possible, and this may be achieved by frequently replacing the alkaline medium with fresh alkaline medium during the course of a reaction. Thus, frequent replacements of the alkaline medium tend to destabilize $Pb^{4+}$ in the pyrochlore, to retard lead-rich compound formation and to consequently favor the formation of stoichiometric pyrochlore.

The dissolution of $Pb^{4+}$ from the pyrochlore may also be accelerated by keeping the concentration of alkaline medium as high as is reasonably possible. It is found, in general, that the reduction of the A to B ratio towards 1.0:1.0 for all of the pyrochlores under discussion is favored by very concentrated alkaline media.

The described reaction is carried out for a time sufficient for reaction to occur. With many reactant combinations, at least a partial reaction occurs almost instantly. In any event, the length of time over which the reaction should be allowed to proceed is a matter of choice. Within limits, however, the longer the reaction time, the greater the extent of reaction. As a practical matter, a significant amount of reaction product is obtained by reacting for about one day, and generally a reaction time of about 3 to about 7 days is advantageous.

After the reaction is completed, the reaction product may be separated by known separation means. These separation techniques include filtration and centrifugation. Various post treatments may be employed as desired. These might include heat treatments to improve the crystallinity of the product and/or washing in various media in order to leach out any A cation-rich products and/or unreacted metal species.

In a preferred embodiment of this invention, the pyrochlore reaction product that has been separated from the reaction medium may be washed in an organic liquid such as methanol or acetone before the pyrochlore is dried. The residual surface species left by such an organic liquid wash will decompose during the drying step, thereby generating a locally reducing atmosphere at the surface of the pyrochlore. In the case of lead ruthenate, for example, this temporary locally reducing atmosphere will tend to destablize any $Pb^{4+}$ ions which may have been present and thus insure the formation of stoichiometric pyrochlore, as desired. The reaction product ultimately obtained includes one or more of the pyrochlore compounds of formula (1) above.

Among the stoichiometric pyrochlore compounds obtained by the method of the present invention are:

$$Pb_2Ru_2O_{7-y} \qquad (2)$$

$$Pb_2Ir_2O_{7-y} \qquad (3)$$

$$PbBiRu_2O_{7-y} \qquad (4)$$

$$PbBiIr_2O_{7-y} \qquad (5)$$

$$Pb_aBi_bRu_2O_{7-y} \qquad (6)$$

$$Pb_2Ru_cIr_dO_{7-y} \qquad (7)$$

and the like, wherein y is as defined, and wherein $a+b=2$ and $c+d=2$. Also, included are the bismuth counterparts to the foregoing and other variations within the scope of formula (1) which should now be apparent to the artisan. As mentioned, the above pyrochlores produced by the method of the present invention exhibit a high electronic conductivity, thus making them particularly useful for electrode applications, e.g. as oxygen electrodes.

The present invention will be more fully appreciated in view of the following examples. However, these examples are presented for illustrative purposes, and the present invention should not be construed to be limited thereto:

EXAMPLE 1

A stoichiometric lead ruthenate pyrochlore, e.g. $Pb_2Ru_2O_{7-y}$, is prepared as follows:

$Pb(NO_3)_2$ and $Ru(NO_3)_3$ are combined in aqueous solution in an approximately 1.5:1.0 molar ratio of lead to ruthenium, that is about 4.92 grams of $Pb(NO_3)_2$ and about 2.84 grams of $Ru(NO_3)_3$ (in aqueous solution) are added to 250 ml of distilled water. This solution, after being stirred, is then added to 500 ml of 12 M potassium hydroxide which has been preheated to 75° C. Precipitation of a solid occurs immediately. The reaction is carried out, with stirring, for approximately 260 hours with seven interruptions for replacement of the alkaline medium with fresh alkaline medium (12 M KOH). The solid is then separated by vacuum filtration, washed in distilled water, and dried at 100° C. X-ray diffraction shows that the reacted product is a crystalline material exhibiting the pyrochlore crystal structure. Furthermore, the X-ray diffraction pattern is in agreement with the X-ray data presented by Longo, Raccah and Goodenough, Mat. Res. Bull., Vol. 4, pp. 191–202 (1969), for $Pb_2Ru_2O_{7-y}$. Thus, by using the method of the present invention stoichiometric, or non lead-rich, pyrochlore is synthesized. The surface area of the synthesized product, measured by the BET $N_2$ absorption method, is 142 m$^2$/g.

EXAMPLE 2

A stoichiometric lead ruthenate pyrochlore, e.g. $Pb_2Ru_2O_{7-y}$, is prepared as follows:

$Pb(NO_3)_2$ and $Ru(NO_3)_3$ are combined in aqueous solution in an approximately 1.0:1.0 molar ratio of lead to ruthenium, that is about 3.28 grams of $Pb(NO_3)_2$ and about 2.84 grams of $Ru(NO_3)_3$ (in aqueous solution) are added to 250 ml of distilled water. This solution, after being stirred, is then added to 500 ml of 9 M potassium hydroxide which has been preheated to 75° C. Precipitation of a solid occurs immediately. The reaction is carried out, with stirring for 64 hours. The solid is then separated by vacuum filtration, washed in hot distilled water, washed in methanol and dried at 100° C. X-ray diffraction shows that the reacted product is a crystalline material exhibiting the pyrochlore crystal structure.

Furthermore, the x-ray diffraction pattern is in agreement with the x-ray data presented by Longo, Raccah and Goodenough, *Mat. Res. Bull.*, Vol. 4, pp. 191–202 (1969), for $Pb_2Ru_2O_{7-y}$. Thus, by using the method of the present invention stoichiometric, or non lead-rich, pyrochlore is synthesized. The surface area of the synthesized product, measured by the BET $N_2$ adsorption method, is 77 $m^2/g$.

EXAMPLE 3

To illustrate the utility of the compound which is obtained by the method of Example 2, electrocatalytic performance data are obtained in 3 N KOH at 75° C. In these tests, the material is fabricated into test electrodes consisting of the catalyst, a binder, a wetproofing agent and a support. Teflon serves as both a binder and wetproofing agent for all the electrodes tested. Gold expanded metal screen is used as the support.

Electrodes are fabricated by mixing a weighed amount of catalyst with a few drops of water, adding a measured volume of Teflon 42 suspension, and mixing vigorously to precipitate the Teflon. The gummy product is then spread on weighed gold Exmet screen and is pressed dry between filter paper. The electrode is then cold pressed for 0.5 min. at 200 psi, is allowed to air dry for 30 min. and is then hot pressed in an inert atmosphere at 325° C., 500 psi for 0.5 min. After cooling, the electrode is weighed to determine its loading and then placed in the electrochemical cell for testing.

The electrochemical half-cell used for testing is of the interface maintaining type and consists of a jacketed lqiuid phase cell compartment. The liquid side contains the platinum wire counter electrode, a saturated calomel reference electrode (in contact by Lugin capillary), and magnetic stirrer. The gas side contains the gas (oxygen) inlet and outlet and a stopcock to drain off any condensate. The working electrode is held in place (between the two compartments) between two Teflon discs with a gold current collector pressing against it.

The cell is connected to a Princeton Applied Research Model 173 potentiostat with a programmer and logarithmic current converter. Constant rate potential sweep measurements are conducted. Outputs of potential and log of current are recorded on an x-y plotter, and the resulting potential vs. log current density plot, referred to as a performance curve, is used to evaluate the electrode activity.

Table I shows performance data for the electrocatalytic reduction of oxygen in 3 N KOH at 75° C. using the stoichiometric pyrochlore of Example 2. Also included in Table I are data for a stoichiometric lead ruthenate, of 6 $m^2/g$ surface area, prepared by conventional solid state reaction techniques. The data in Table I show that the stoichiometric pyrochlore of Example 2 does have significant electrochemical activity for oxygen reduction. Furthermore, the data in Table I shows that the stoichiometric pyrochlore of Example 2 (which is prepared at low temperature out of solution and consequently has a relatively high surface area) has oxygen electro-reduction capability superior to the lower surface area, stoichiometric pyrochlore synthesized by conventional solid state techniques.

TABLE I

Activity Data For The Electro-Reduction Of Oxygen In 3N KOH at 75° C.

| Current Density (mA/cm²) | Potential (mV vs. RHE) | |
|---|---|---|
| | $Pb_2Ru_2O_{7-y}$ Of Example 2 | $Pb_2Ru_2O_{7-y}$ Prepared by Conventional Solid State Reaction Techniques |
| 0.5 | 1074 | 938 |
| 1.0 | 1074 | 920 |
| 5.0 | 998 | 886 |
| 10 | 938 | 869 |
| 25 | 891 | 837 |
| 50 | 856 | 800 |
| 75 | 830 | 770 |
| 100 | 802 | — |
| 125 | 770 | — |

What is claimed is:

1. A method of preparing compounds having the formula:

$$A_2B_2O_{7-y}$$

wherein A is selected from the group consisting of lead, bismuth and mixtures thereof, wherein B is selected from the group consisting of ruthenium, iridium and mixtures thereof, wherein y is a value such that $0 \leq y \leq 1$, comprising:

reacting A cations and B cations, in approximately stoichiometric amounts, from an aqueous solution source of these cations in a liquid alkaline medium having a pH of at least about 13.5 in the presence of an oxygen source at a temperature below about 200° C. for a sufficient time for reaction to occur.

2. The method of claim 1 wherein said aqueous solution source contains A source material selected from the group consisting of lead nitrate, lead oxide, lead chloride, lead acetate, lead carbonate, lead citrate, lead oxalate, bismuth nitrate, bismuth oxide, bismuth chloride, bismuth oxalate, bismuth oxychloride and mixtures thereof and B source material selected from the group consisting of ruthenium chloride, ruthenium nitrate, ruthenium nitrosyl nitrite, iridium chloride, iridium hydroxide and iridium oxalic acid.

3. The method of claim 2 wherein said liquid alkaline medium is an aqueous basic solution of alkali metal hydroxide.

4. The method of claim 3 wherein said aqueous basic solution contains a base selected from the group consisting of sodium hydroxide, rubidium hydroxide, cesium hydroxide, potassium hydroxide and mixtures thereof.

5. The method of claim 4 wherein said reacting is performed within the temperature range of about 10° C. to about 100° C.

6. The method of claim 5 wherein said pH is within the range of about 14 to about 15.5.

7. The method of claim 6 wherein said reacting is performed within the temperature range of about 50° C. to about 80° C.

8. The method of claim 1 wherein, during said reacting, sufficient fresh alkaline medium is added to the reaction to retard formation of A cation-rich compound and to facilitate the desired reaction.

9. The method of claim 1 wherein, after said reacting, the product obtained is subjected to leaking to remove undesired impurities.

10. The method of claim 1 wherein A is lead.

11. The method of claim 10 wherein said aqueous solution source contains as A source material lead nitrate and contains B source material selected from the group consisting of ruthenium nitrate and iridium chloride.

12. The method of claim 11 wherein said reacting alkaline medium is an aqueous basic solution of alkali metal hydroxide.

13. The method of claim 12 wherein said aqueous basic solution contains a base selected from the group consisting of sodium hydroxide, rubidium hydroxide, cesium hydroxide, potassium hydroxide and mixtures thereof.

14. The method of claim 13 wherein said reacting is performed within the temperature range of about 10° C. to about 100° C.

15. The method of claim 14 wherein said pH is within the range of about 14 to about 15.5.

16. The method of claim 15, wherein said reacting is performed within the temperature range of about 50° C. to about 80° C.

17. The method of claim 10 wherein, during said reacting, sufficient fresh alkaline medium is added to the reaction to retard formation of A cation-rich compound and to facilitate the desired reaction.

18. The method of claim 10 wherein, after said reacting, the product obtained is subjected to leaking to remove undesired impurities.

19. The method of claim 1 wherein A is bismuth.

20. The method of claim 19 wherein said aqueous solution source contains as A source bismuth nitrate and contains B source material selected from the group consisting of ruthenium nitrate and iridium chloride.

21. The method of claim 20 wherein said liquid alkaline medium is an aqueous basic solution of alkali metal hydroxide.

22. The method of claim 21 wherein said aqueous basic solution contains a base selected from the group consisting of sodium hydroxide, rubidium hydroxide, cesium hydroxide, potassium hydroxide and mixtures thereof.

23. The method of claim 22 wherein said reacting is performed within the temperature range of about 10° C. to about 100° C.

24. The method of claim 23 wherein said pH is within the range of about 14 to about 15.5.

25. The method of claim 24 wherein said reacting is performed within the temperature range of about 50° C. to about 80° C.

26. The method of claim 19 wherein, during said reacting, sufficient fresh alkaline medium is added to the reaction to retard formation of A cation-rich compound and to facilitate the desired reaction.

27. The method of claim 19 wherein, after said reacting, the product obtained is subjected to leaking to remove undesired impurities.

* * * * *